A. G. KOLBE.
BELT.
APPLICATION FILED MAY 9, 1913.
1,147,874. Patented July 27, 1915.
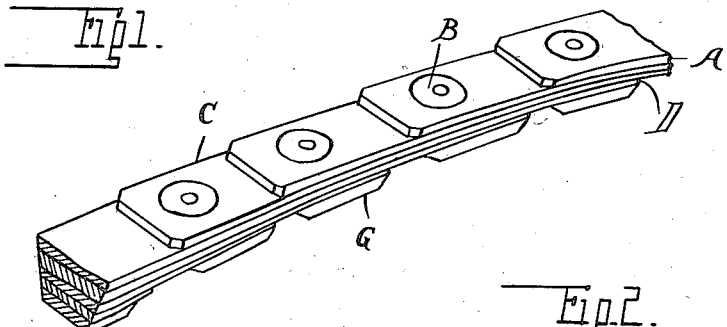
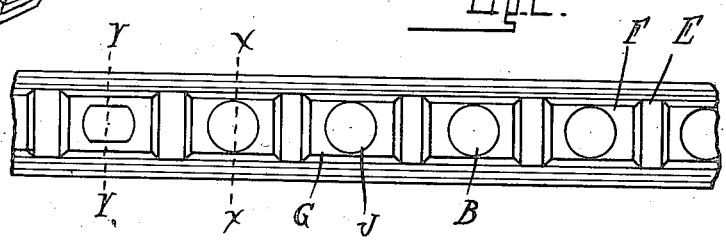
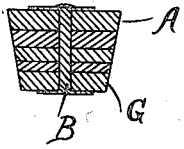
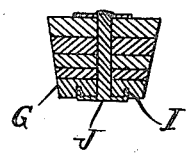
Witnesses
W. K. Ford
James P. Barry
Inventor
August G. Kolbe
By Whitmore Hulbert Whitmore
Atty's

UNITED STATES PATENT OFFICE.

AUGUST G. KOLBE, OF DETROIT, MICHIGAN, ASSIGNOR TO DETROIT OAK BELTING COMPANY, OF DETROIT, MICHIGAN, A CORPORATION OF MICHIGAN.

BELT.

1,147,874.  Specification of Letters Patent.  Patented July 27, 1915.

Application filed May 9, 1913. Serial No. 766,568.

*To all whom it may concern:*

Be it known that I, AUGUST G. KOLBE, a citizen of the United States of America, residing at Detroit, in the county of Wayne and State of Michigan, have invented certain new and useful Improvements in Belts, of which the following is a specification, reference being had therein to the accompanying drawings.

The invention relates to driving belts and more particularly to that type of belt formed of a plurality of sections of leather or the like, secured together.

The invention resides in the peculiar construction, arrangement and combination of parts as will more fully hereinafter appear and as pointed out in the claims.

In the drawings, Figure 1 is a perspective view of a portion of the belt embodying the invention; Fig. 2 a bottom plan view thereof; Fig. 3 a section on the line $x$—$x$ of Fig. 2; and Fig. 4 a section on the line $y$—$y$ of Fig. 2.

While my invention is adapted for various types of belts, I will describe the same as embodied in a wedge-shaped belt for grooved pulleys.

As shown, the belt is formed of a plurality of overlapping sections A which are connected together by suitable securing means such as rivets B, passing through the several overlapping sections. In the construction illustrated the sections are so overlapped that the rivets each pass through four sections, the rivets passing through the upper sections adjacent their ends C, and through the lower section adjacent the opposite ends D. In order to obtain a substantially uniform thickness of the belt the sections are tapered toward the ends D, and in wedge-shaped belts the sections are also slightly tapered longitudinally.

The parts so far described may be considered as forming one ply, which consists of several thicknesses of material. Secured to the bottom face E of this ply is a second ply F, which in the belt shown, is formed of a plurality of short, spaced sections G of comparatively thick material which are connected to the ply F by the rivets B. These sections not only serve to increase the thickness of the belt but also avoid the ends D being exposed. The belt therefore, may run in either direction.

For certain uses it is desirable to anchor the members G against turning. This may be accomplished by providing a securing means, with a suitable anchor, and where rivets are used for securing the plies together, the side edges I of the rivet head J are turned down and embedded in the section G.

A belt embodying the invention forms a very strong structure and may be made of considerable thickness while at the same time, providing a very high degree of flexibility.

What I claim as my invention is:—

1. A belt including a ply formed of a series of overlapping comparatively short sections, each section having its end portions respectively forming portions of the inner and the outer face of the belt, another ply comprising a plurality of short spaced sections of comparatively heavy material, respectively arranged over the inner end portions of the sections forming the first-mentioned ply, and securing means passing through each section of the second-mentioned ply and through the first-mentioned ply.

2. A belt including a series of comparatively short overlapping sections laterally tapered, each section having its end portions respectively forming portions of the inner and outer faces of the belt, a series of comparatively thick sections respectively arranged over the inner ends of the first-named sections and having their lateral faces continuous with the corresponding lateral faces of the first-named sections, and a common means for securing the overlapping sections to each other and the comparatively thick sections to the overlapping sections.

In testimony whereof I affix my signature in presence of two witnesses.

AUGUST G. KOLBE.

Witnesses:
GRACE CLUE,
E. A. LUDDEN.